Nov. 14, 1967  E. F. MILLER  3,352,594
TRUCK BODY
Filed Nov. 10, 1965  3 Sheets-Sheet 3
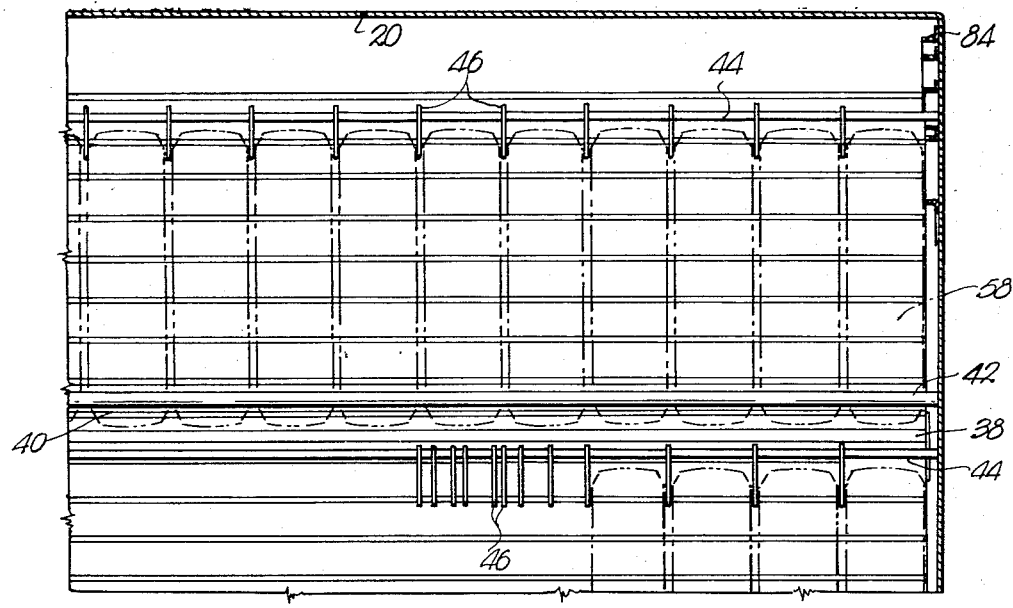
Fig. 3.
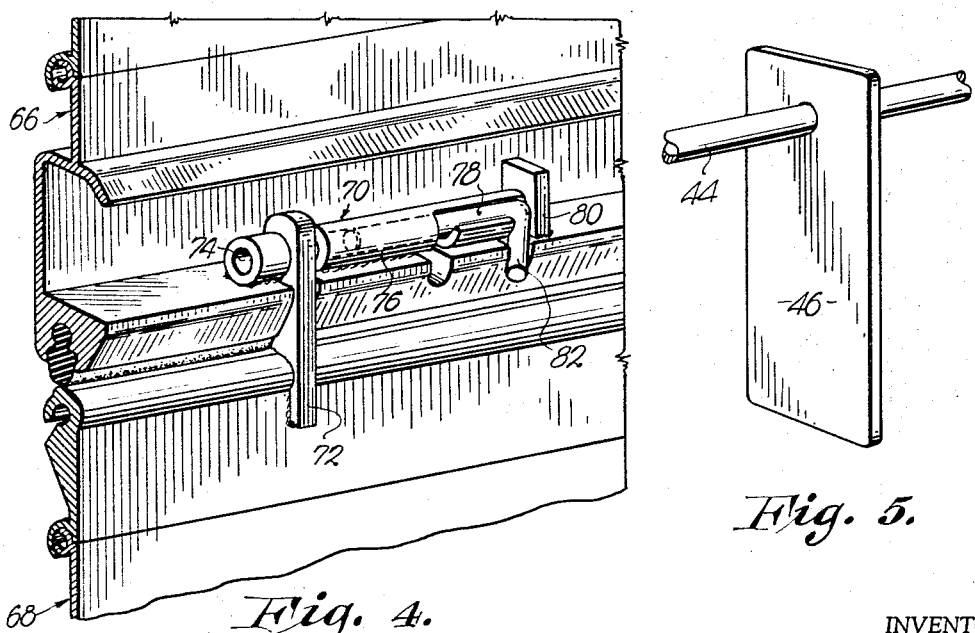
Fig. 4.
Fig. 5.
INVENTOR
Eldon F. Miller
BY
ATTORNEYS 3,352,594
TRUCK BODY
Eldon F. Miller, Leawood, Kans., assignor to Hesse Carriage Company, Kansas City, Mo., a corporation of Missouri
Filed Nov. 10, 1965, Ser. No. 507,152
8 Claims. (Cl. 296—3)

ABSTRACT OF THE DISCLOSURE

A truck body for carrying a plurality of tires in an upstanding position, the body having a bed supporting a framework, which carries two sets of inwardly inclined tire receiving shelves, one on each side of the body, each of the shelves having a bar corresponding thereto, the bar and the shelf being in engagement with the tires carried by the shelf at spaced-apart points to retain the tires on the shelf, there being a rod corresponding to each shelf and carrying a locking plate which is slidable longitudinally of the rod for engagement with the tires on the shelf to retain the tires in upstanding, side-by-side relationship. A series of tire racks is disposed centrally of the body between the sets of shelves for receiving additional tires in an upstanding position and the body is provided with overhead doors for gaining access to the shelves and the racks.

---

This invention relates to a truck body and, more particularly, to a body which is especially designed to carry a large number of vehicle tires in an upstanding position.

Thus, it is the primary object of this invention to provide a truck body for carrying a plurality of tires in an upstanding position, which body comprises an enclosed bed, the body having disposed therewithin a plurality of vertically spaced, inwardly inclined shelves, there being two sets of shelves, one adjacent each side of the body, there being a series of tire racks disposed centrally of the body and between the spaced-apart sets of shelves.

Yet a further object of this invention is to provide, in a truck body, tire-carrying means whereby maximum utilization of the body may be obtained by positioning said tire-carrying means in such a manner that the tires are retained in an upstanding position, that is on edge, the tire-carrying means consisting of a plurality of inwardly inclined shelves, there being a set of shelves on each side of the truck body and a series of tire racks between the shelves, the truck body being provided with a number of door units which may be selectively opened to gain access to desired shelves or racks.

It is a yet further object of the invention to provide, in a tire-carrying truck body, a plurality of door units, each unit consisting of an upper door and a lower door, said doors being selectively slidable in a vertical path whereby tires may be placed in or removed from the interior of the truck body.

Other objects of this invention include the particular arrangement of the tire-carrying shelves, the stop members which are provided thereupon and which cooperate with a corresponding bar for each shelf, the stop member and the bar engaging the tires on the shelf at spaced points whereby to retain the same in side-by-side, upstanding relationship; the provision of a series of tire racks centrally of the body, which racks are accessible from and through the sides of the body, said racks each consisting of a pair of horizontally spaced bars; and the locking plates which are carried by a rod, which rod is in overlying relationship to each of the shelves and each of the racks whereby the plates may be slidably moved therealong into engagement with the outermost tire of a series and then canted into a locking position whereby to retain the tires in aligned, upstanding relationship; as well as other details of construction which will become apparent from the following specification and accompanying drawings, wherein:

FIG. 3 is a sectional view taken along line 3—3 of FIG. 2;

FIG. 4 is an enlarged, fragmentary, perspective view of the door coupling assembly; and FIG. 5 is an enlarged, fragmentary, perspective view of a locking plate and its associated rod.

The truck body 10 is adapted to be carried by and mounted upon a conventional truck tractor unit 12, which tractor unit normally carries as a part thereof a chassis 14 extending rearwardly, the truck being supported by a suitable number of wheels 16. It will be appreciated that the body 10, to be hereinafter described, can be mounted upon any suitable chassis which is capable of receiving the same and carrying the load thereof.

Figure 1:
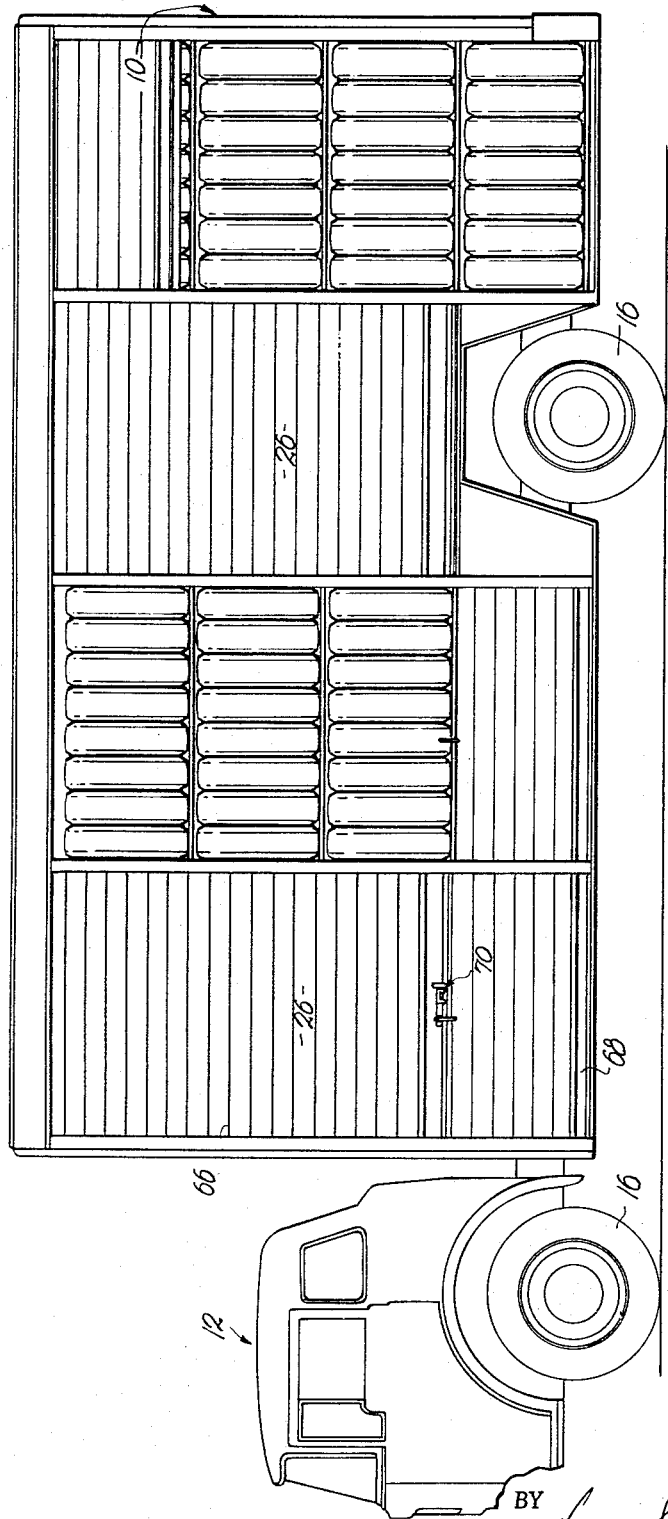
FIGURE 1 is a side elevational view of a truck having a body made pursuant to the subject invention, two of the door units being shown in an open condition.
Figure 2:
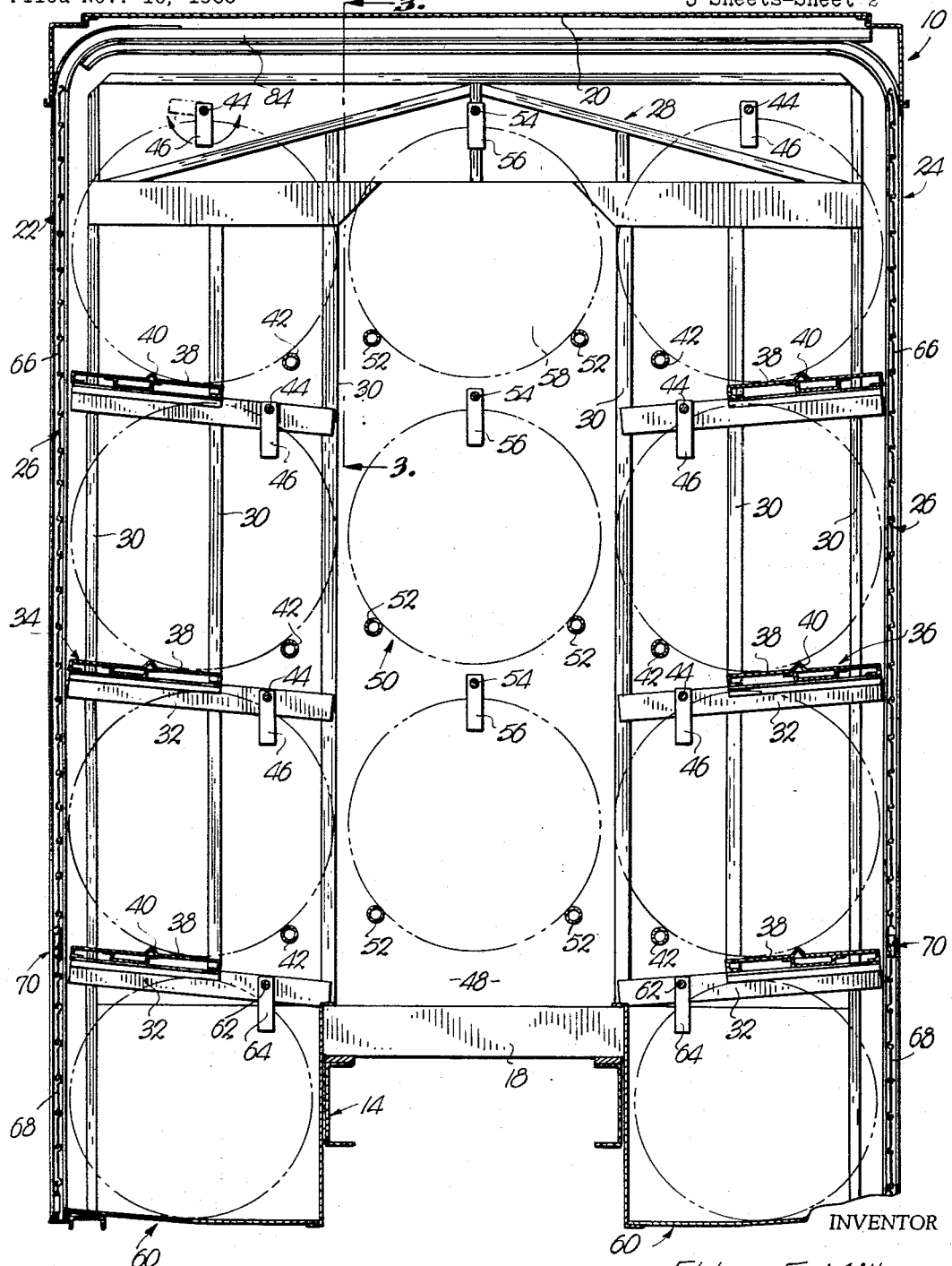
FIG. 2 is a central transverse, sectional view of the truck body showing the tire-carrying means, the tires being shown in dashed lines.

Body 10 includes a bed 18, a roof 20, and sidewalls 22 and 24, the sidewalls each being made up of a plurality of door units 26, each of the door units being substantially identical in construction, which construction will be hereinafter set forth. There is provided, interiorly of the body 10, tire-carrying and supporting structure. Included in this structure is a framework, broadly designated by the numeral 28, which framework rests upon the bed 18 and is likewise suitably secured to the roof or other structural component whereby to retain the frame 28 in a fixed position within the body 10, frame 28 consisting of a plurality of upright struts 30 which span the distance between the bed and the roof, and a plurality of shelf-supporting struts 32 which are normally disposed in a position inclined slightly from the horizontal, all as best shown in FIG. 2 of the drawings.

Framework 28 supports two sets of shelves 34 and 36, the set of shelves 34 being disposed adjacent the sidewall 22 of the body 10 and the set of shelves 36 being disposed adjacent the sidewall 24 of the truck body 10. Each set of shelves is identical in construction and includes a plurality of vertically spaced, inwardly inclined shelf members 38, three of such shelf members 38 being shown on each set of shelves 34 and 36 in the embodiment chosen for illustration.

Shelf members 38 extend the full length of body 10 and are suitably supported by the struts 32, it being noted that members 38 do not span the full width of the shelf set but terminate substantially centrally thereof for purposes which will hereinafter be made apparent.

Each shelf member 38 has a stop member 40 secured thereto or fabricated as a part thereof, the stop member, as shown in the drawings, consisting of a V-shaped piece which extends upwardly from the upper surface of the shelf member 38, whereby it can be brought into engagement with the tires which are placed upon the shelves 38.

Corresponding to each shelf member 38 is a longitudinally extending bar 42, which bars can either be supported by the frame 28 or between the bulkheads of the truck body 10, it being noted that bars 42 are spaced inwardly from the stop members 40 and in a plane above the plane within which stop members 40 are positioned. Thus, each set of shelves 34 and 36 presents a plurality of inwardly inclined, vertically spaced shelves 38 which lie in a first plane; and a plurality of longitudinally extending bars 42 which are positioned inwardly from the shelf members 38 and in a plane thereabove.

Also associated with each shelf member 38 is a longitudinally extending rod 44, there being a rod corresponding to each shelf member, each rod 44 carrying a swingable locking plate 46 which normally depends therefrom, but which may be swung to any desired position with respect to the rod 44, plates 46 also being slidable longitudinally of their corresponding rods 44.

Inasmuch as sets of shelves 34 and 36 are spaced apart and are each positioned adjacent a corresponding side of the vehicle of the truck body, there is presented a central passageway 48, this passageway 48 receiving a series of tire racks 50, each rack consisting of a pair of horizontally spaced bars 52, said bars 52 extending throughout a part of the length of the passageway 48, the remaining, and normally rear end of said passageway 48, being left open so that, by means of a door provided in the rear of the body, access may be gained to the interior of the body.

It will be noted that the bars 52 which comprise each of the racks 50 are in a plane slightly above that of the bars 42, it thus being appreciated that the shelves 38 lie in a first plane; the bars 42 which cooperate with shelves 38 lie in a second plane; and the bars 52, which comprise racks 50, lie in a third plane, said planes being successively higher and there being a rack 50 corresponding to each pair of opposed shelves 38, all as is apparent from FIG. 3 of the drawings.

Thus, it will be appreciated that a plurality of tires may be carried in an upstanding, on-edge position by each of the shelves 38 and likewise, a plurality of tires may be carried in a similar manner by each of the racks 50. Further, each of the racks 50 has disposed in overlying relationship thereto, a rod 54, each of which rods has thereupon a plurality of locking plates 56 which are similar in construction and operation to the locking plates 46 carried by rods 44 so that, when a number of tires are placed upon a rack 50, plate 56 may be moved along the corresponding rod 54 and into engagement with the end tire, such as 58 shown on the upper rack in FIG. 3, and the plate 56 then canted to wedge the same into locking engagement with the end tire 58 whereby to retain said tire 58, and those disposed forwardly thereof, for instance, in upstanding, side-by-side relationship and to prevent the same from falling during transportation. The locking plates 46 which are associated with each of the shelves 38, operate in a similar manner and are intended to be wedged into position upon bar 44 and against the end tire of a group, whereby to retain the group of tires in side-by-side, upstanding relationship.

It will be noted that bed 18 has carried thereby, beneath each set of shelves 34 and 36, a longitudinally extending well 60, each of said wells likewise receiving a number of tires in upstanding, side-by-side relationship, there being a rod 62 carried by the frame 28 and extending longitudinally of the body, said rods 62 carrying a plurality of locking plates 64 for retaining the tires disposed within the wells 60 in side-by-side, upstanding relationship.

It will be further noted that after gaining access to the interior of body 10 by means of the door units 26, the tires carried centrally of the body by racks 50, may be obtained from said racks or placed thereupon by reaching across the appropriate shelf 38 and removing from or placing upon the rack 50 a tire or tires. Thus, by gaining access through one side of the truck body, all of the tires on one set of shelves, such as 36, for instance, are readily accessible as are all of the tires carried upon the series of racks 50. It will be appreciated that such easy accessibility gives a greater selection of tires and as a result of the same being maintained in side-by-side relationship, the desired tire may be readily and quickly selected from the interior of the truck body.

To aid in such quick selection, each of the door units 26 includes an upper door 66 and a lower door 68, the doors being coupled together when both are closed by a coupling assembly 70. Coupling assembly 70 consists of a lug 72 which is secured to and extends upwardly from lower door 68 into overlying relationship with upper door 66, said lug 72 having an opening therein (not shown) which is in alignment with the central passage 74 of a two-part sleeve 76 which is secured to the upper door 66. As best shown in FIG. 4, the two-part sleeve, which straddles lug 72 when the doors are in a closed condition, slidably carries a bolt member 78, the movement of the bolt member 78 in one direction being limited by a stop plate 80 secured to upper door 66.

When it is desired to couple the doors 66 and 68 together the bolt 78 is grasped by its handle 82, swung upwardly, viewing FIG. 4, and moved to the left whereby to pass through the opening in lug 72, the handle 82 then being swung downwardly into engagement with a notch formed in the sleeve 76 and the lower edge of upper door 66 whereby to securely lock the doors together, this being necessary when it is desired to operate the doors 66 and 68 as a unit rather than independently.

Doors 66 and 68 are vertically slidable and move along trackways 84 which extend vertically of the sides of the body and across the roof 20 thereof therebeneath. Thus, when it is desired to gain access to the uppermost of shelves 38, the coupling assembly is operated to disengage the lower door 68 from the upper door 66 and, while the lower door 68 remains in a closed condition, the upper door 66 may be raised and the entire door moved upwardly along tracks 84 into substantially parallel relationship to the roof 20, the upper door 66 being of such a length that the entire door may be received beneath the roof 20. Access then may be gained to the uppermost shelf 38 or, for that matter, the uppermost rack 50.

When it is desired to gain access to either of the two lowermost shelves 38 or the well 60, the upper door 66 and lower door 68 remain coupled together, and the entire door unit is raised upwardly whereby to gain access to any of the above-mentioned shelves, the corresponding racks 50 or the well 60, it being appreciated that the over-all height of the door is such that, when the upper door and lower door are left coupled together and raised, the lower door is in a closed condition over uppermost shelf 38. Thus, the two part door unit is designed so that the user of the truck body may obtain a maximum tire storage space therewithin and yet readily gain access thereto.

It will be appreciated that a body such as hereinabove described can be used either to transport a large number of vehicle tires from place-to-place or, if desired, can be used to display such tires to dealers or others, inasmuch as the door units may be raised, giving access to all of the tires carried within the truck body, further access being possible through the rear portion of the passageway 48.

Having thus described the invention, what is claimed as new and desired to be secured by Letters Patent is:

1. A truck body for carrying tires in an upstanding position, said body comprising:
   a bed;
   a framework on said bed;
   a plurality of vertically spaced, inwardly inclined, tire-receiving shelves carried by said framework;
   a longitudinally extending bar corresponding to each shelf, each shelf and the bar corresponding thereto being in engagement with each of the tires carried by said shelf at spaced-apart points thereupon whereby to retain said tires upon said shelf;
   a longitudinally extending rod corresponding to each shelf and disposed thereabove; and
   at least one locking plate carried by each rod and slidable longitudinally thereof, said plates being engageable with the tires on a corresponding shelf whereby to retain the same in upstanding, side-by-side relationship.

2. A truck body as set forth in claim 1, there being two spaced-apart sets of shelves, one set on each side of the body, each set including several shelves; and a series of tire racks disposed between said sets of shelves and centrally of said body.

3. A truck body as set forth in claim 2, each of the racks in said series comprising a pair of longitudinally extending, horizontally spaced-apart bars.

4. A truck body as set forth in claim 3, there being a longitudinally extending rod corresponding to each rack and disposed thereabove; and at least one locking plate carried by each rod, said plates being engageable with the tires on a corresponding rack whereby to retain the same in upstanding, side-by-side relationship.

5. A truck body as set forth in claim 4, said shelves each lying in a first plane, the bars corresponding thereto lying in a second plane above said first plane, there being a rack corresponding to each pair of opposed shelves, the bars comprising each said rack lying in a third plane, above said second plane.

6. A truck body as set forth in claim 5, said body having a roof in overlying relationship to said shelves and said racks; and doors on the sides thereof for gaining access to said shelves and said racks.

7. A truck body as set forth in claim 6, the doors on the sides of the body being vertically slidable, each side having a plurality of door units, each unit consisting of an upper door and a lower door.

8. A truck body as set forth in claim 7, the upper door being coupled to the lower door when both doors in a unit are closed.

References Cited

UNITED STATES PATENTS

| 2,468,513 | 4/1944 | Rider | 296—3 X |
| 2,721,662 | 10/1955 | Miller | 211—71 |

LEO FRIAGLIA, *Primary Examiner.*

PHILIP GOODMAN, *Examiner.*